United States Patent [19]
Maida

[11] 3,964,080
[45] June 15, 1976

[54] ELECTROMAGNETIC TRIGGER DEVICE IN A CAMERA CAPABLE OF EFFECTING TIME PHOTOGRAPHY

[75] Inventor: Osamu Maida, Tokyo, Japan
[73] Assignee: Nippon Kogaku K.K., Tokyo, Japan
[22] Filed: Jan. 17, 1975
[21] Appl. No.: 542,083

[30] Foreign Application Priority Data
Jan. 22, 1974  Japan.................................. 49-8947

[52] U.S. Cl................................. 354/234; 352/121; 352/169; 352/174; 354/254
[51] Int. Cl.² .................... G03B 9/08; G03B 21/38; G03B 17/38
[58] Field of Search ........... 354/170, 171, 173, 204, 354/206, 212, 213, 234, 250, 254; 352/121, 169, 174, 136, 176, 177

[56] References Cited
UNITED STATES PATENTS

| | | | |
|---|---|---|---|
| 3,598,480 | 8/1971 | Kubota et al. ........................ | 352/169 |
| 3,705,764 | 12/1972 | Reinsch ............................... | 352/121 |
| 3,767,298 | 10/1973 | Reinsch ............................... | 352/169 |
| 3,809,466 | 5/1974 | Kobayashi........................... | 352/169 |
| 3,895,863 | 7/1975 | Hashimoto et al................... | 352/169 |
| 3,898,000 | 8/1975 | Kobayashi et al. .................. | 352/121 |

*Primary Examiner*—L. T. Hix
*Assistant Examiner*—James LaBarre
*Attorney, Agent, or Firm*—Shapiro and Shapiro

[57] ABSTRACT

In an electromagnetic trigger device in a camera capable of effecting time photography, and having a trigger switch, a power source and a motor for driving a shutter driving mechanism, there is provided a restraining lever movable between a restraining position and a non-restraining position. The lever, when in the restraining position, restrains the shutter driving mechanism in fully closed shutter position. A motor switch is adapted to be closed to energize the motor when the restraining lever is in the non-restraining position. A phase switch is parallel-connected to the motor switch and operatively associated with the shutter driving mechanism to be opened in the fully open and the fully closed position of the shutter. An actuating coil is responsive to closing of the trigger switch to be connected to the power source for a predetermined time and thereby energized to attract the restraining lever to the non-restraining position. A selector member is provided for selecting continuous photography and time photography. A holding coil is responsive, during continuous photography, to closing of the trigger switch to be connected to the power source and thereby energized to hold the restraining lever in the non-restraining position. A current generating circuit is provided which includes a timing switch adapted to be opened for a predetermined time from fully opening till fully closing of the shutter. When the trigger switch is opened during continuous photography, the current generating circuit flows a current through the timing switch to maintain the holding coil energized to hold the lever in the non-restraining position.

27 Claims, 17 Drawing Figures

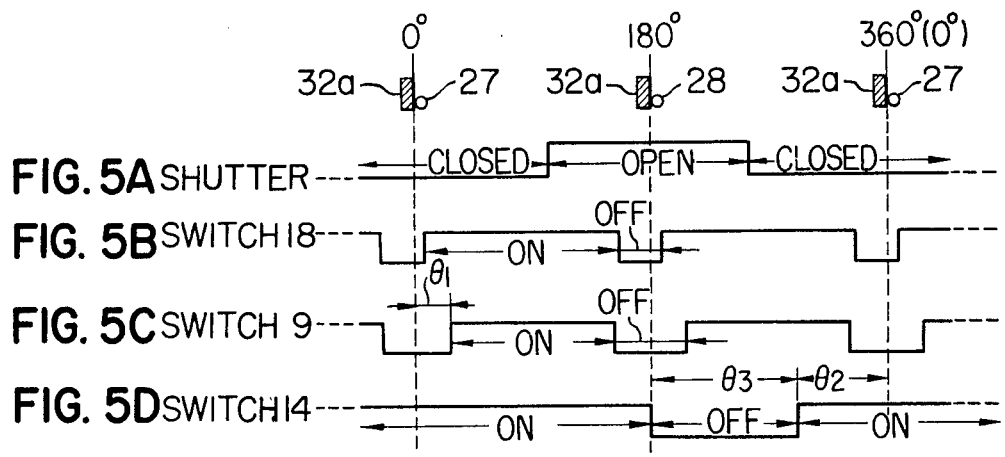
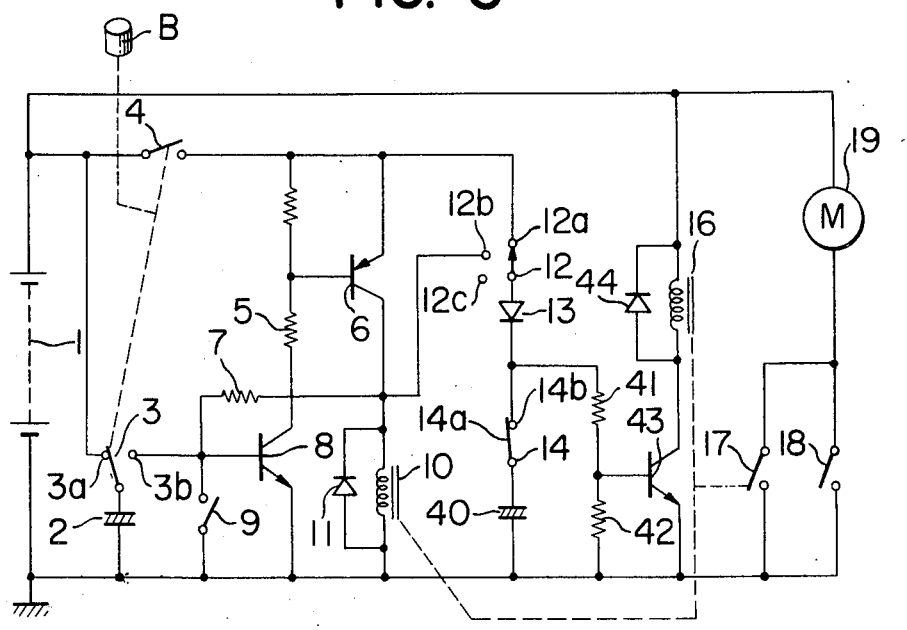

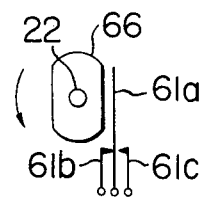
FIG. 9
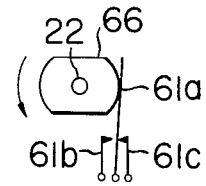
FIG. 10
FIG. 11
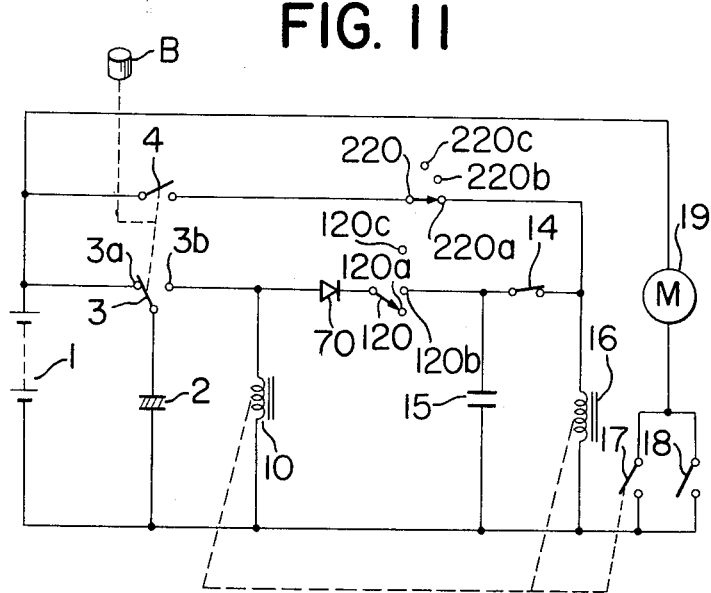
FIG. 12
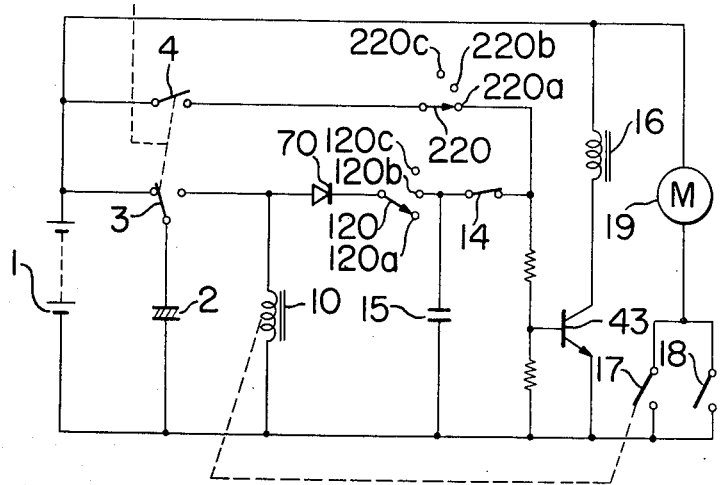

ELECTROMAGNETIC TRIGGER DEVICE IN A CAMERA CAPABLE OF EFFECTING TIME PHOTOGRAPHY

BACKGROUND OF THE INVENTION

1. Field of the Invention

This invention relates to an electromagnetic trigger device in a camera capable of effecting time photography.

2. Description of the Prior Art

In cameras such as, for example, cinecameras wherein a motor is driven by operation of an electromagnetic trigger device for controlling the stop position of shutter and a mechanism for transporting a film and actuating a shutter mechanism is driven by the motor to effect photography, decreasing the exposure time during photography by decreasing the opening angle of the shutter may be done independently of the number of revolutions of the motor, whereas increasing the exposure time by increasing the opening angle of the shutter encounters structural limitations and inevitably depends on the number of revolutions of the motor. For a long time exposure, therefore, the number of revolutions of the motor must be reduced, whereas stable rotation of the motor at low speeds suffers from much limitation and the use of gear reduction would unavoidably involve complication thereof. Also, rotation of the motor continues throughout exposure operation and this leads to great power consumption, which in turn offers problems to ordinary cameras using dry cells or the like. To overcome these, it has already been proposed to obtain a long time exposure by providing single-frame photography means having a member for stopping the shutter in its closed position and a member for stopping the shutter in its open position, and by using such means to stop the motor in open shutter position during single-frame photography.

Such means is disclosed in U.S. Pat. No. 3,721,492, for example. However, in the type of long time exposure shown in that patent, when the release button is depressed to terminate long time exposure of one frame, the shutter is closed and a subsequent frame of film is fed and immediately begins to be exposed.

This is inconvenient for long time exposure wherein long time intervals intervene between adjacent frames of film to be exposed in such a manner that 20-second exposure of a frame is followed by a 5-minute interval which in turn is followed by 20-second exposure of a subsequent frame and then by a 5-minute interval, as in the microscopic photography of cell division, crystal growth or the like. Further, because of the two shutter stop members provided at two different locations for stopping the shutter in its open and its closed position, respectively, an effort to stop the shutter during continuous photography by releasing the release button might possibly stop the shutter in its open position depending on the timing of the release, with an inconvenient result that a portion of the film to be still unexposed is prematurely exposed.

SUMMARY OF THE INVENTION

The present invention intends to eliminate the above-noted disadvantages and to provide a simple and convenient electromagnetic trigger device which, during continuous photography, ensures the shutter to be stopped in its closed position independently of the timing with which the release button is released and which, during time photography, enables opening and closing of the shutter to occur alternately upon each depression of the release button, thereby accomplishing long time exposure.

According to a preferred embodiment of the present invention, an electromagnetic trigger device in a camera capable of effecting time photography comprises a trigger switch, an electrical power source, a motor for driving a shutter driving mechanism, restraining means movable between a restraining position and a non-restraining position, the restraining means being adapted, when in said restraining position, to restrain the shutter driving mechanism as it is in fully closed shutter position, a motor switch adapted to be closed to supply power to the motor when the restraining means is in said non-restraining position, a phase switch parallel-connected to the motor switch and operatively associated with the shutter driving mechanism to be opened when the shutter is fully opened and when the shutter is fully closed, an actuating coil responsive to closing of the trigger switch to be connected to the power source for a predetermined time and thereby energized to attract the restraining means and moves it to the non-restraining position, the predetermined time being shorter than the shorter of the time required for the shutter driving mechanism to move from the fully closed shutter position to the fully open shutter position and the time required for the shutter driving mechanism to move from the fully open shutter position to the fully closed shutter position, a selector member for selecting continuous photography and time photography; a holding coil responsive, when continuous photography is selected, to closing of the trigger switch to be connected to the power source and thereby energized to hold the restraining means in the non-restraining position, and a current generating circuit including a timing switch adapted to be opened for a predetermined time from fully opening till fully closing of the shutter, the current generating circuit being adapted, when the trigger switch is opened during continuous photography, to flow a current through the timing switch to maintain the holding coil energized and hold the restraining means in the non-restraining position.

The invention will become more fully apparent from the following detailed description of various embodiments thereof taken in conjunction with the accompanying drawings, throughout which functionally similar members are given similar reference characters.

BRIEF DESCRIPTION OF THE DRAWINGS

FIG. 5 illustrates the phase relationships of various switches in FIGS. 1 and 2.

FIGS. 6, 7 and 8 are circuit diagrams showing second, third and fourth embodiments of the present invention.

FIGS. 9 and 10 illustrate the operation of the reset switch in FIG. 8.

FIGS. 11, 12, 13 and 14 are circuit diagrams showing fifth, sixth, seventh and eighth embodiments of the present invention.

DESCRIPTION OF THE PREFERRED EMBODIMENTS

Figure 1:
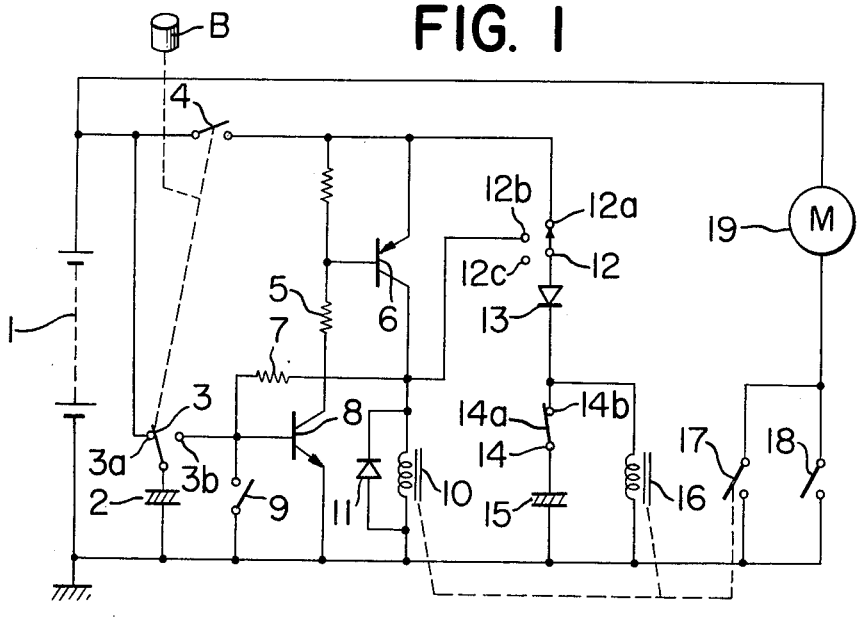
FIG. 1 is a circuit diagram showing a first embodiment of the present invention.

In FIG. 1 which shows a first embodiment of the present invention, there is a power source 1, a starting capacitor 2, and a first trigger switch 3 having change-over contacts 3a and 3b and operatively associated with a second trigger switch 4. The first and second trigger switches 3 and 4 are also operatively associated with a camera's release button B so that upon depression of the release button, i.e. during operation of the camera, the first trigger switch 3 shifts to the contact 3b while the second trigger switch 4 is closed and that upon release of the button, i.e. during inoperative condition of the camera, the first trigger switch 3 shifts to the contact 3a while the second trigger switch 4 is opened. A resistor 5, a PNP transistor 6, a resistor 7 and an NPN transistor 8 together constitute a positive feedback circuit operable as an SCR having bistable conditions. The base of the transistor 8 is connected to the contact 3b of the first trigger switch 3 and, when the first trigger switch is changed over to the contact 3b, the discharging current of the capacitor 2 will flow to the base of the transistor 8 to trigger the transistors 8 and 6 into conductive state. A reset switch 9 is further connected between the base and the emitter of the transistor 8 and maintained open during inoperative condition of the camera.

A first actuating electromagnet coil 10 is connected between the collector of the transistor 6 and the negative terminal of the power source. A diode 11 is parallel-connected to the first electromagnet coil 10 in order to absorb any inverse voltage produced across the coil so as to prevent such inverse voltage from affecting other elements. A photography mode change-over switch 12 has change-over contacts 12a, 12b and 12c and may effect mode selection, as will be described, in such a manner that selection of the contact 12a results in the mode of continuous photography, selection of the contact 12b results in the mode of single-frame photography, and selection of the contact 12c results in the mode of time photography.

The contact 12a is connected to the positive terminal of the power source 1 through the second trigger switch 4, the contact 12b is connected to the collector of the transistor 6, and the contact 12c is connected in no way. An inverse current blocking diode 13, a timing switch 14 and a capacitor 15 are serially connected between the photography mode change-over switch 12 and the negative terminal of the power source 1, and a second electromagnet coil 16 is connected between the junction between the diode 13 and the timing switch 14 and the negative terminal of the power source 1. The first electromagnet coil 10 has its number of coil turns and its resistance value selected such that it usually passes therethrough a great current to produce a magnetic force necessary to actuate an attractable member 32b which will later be described, and the second electromagnet coil 16 has its number of coil turns and its resistance value selected such that it usually passes therethrough a small current to produce a magnetic force sufficient to hold the attractable member 32b in attracted position. A motor switch 17 is adapted, when a restraining lever 32 to be described is liberated from its restraining position upon energization of the electromagnet, to be closed and thereby control a DC motor 19 series-connected to the power source 1 through the motor switch 17. Preferably, a phase switch 18 may be parallel-connected to the motor switch 17 so as to determine position of a shutter driving and film transporting member driven from the motor 19, as will further be described. (The negative terminal of the power source 1 is shown to be grounded to the camera body, for the purpose of illustration in connection with the mechanism portion).

Figure 2:
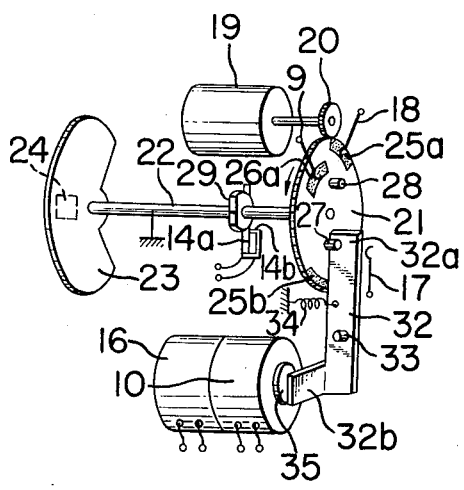
FIG. 2 is a perspective view of an embodiment of the mechanism portion according to the present invention.

FIG. 2 is a perspective view showing an embodiment of the mechanism portion to which the circuit of FIG. 1 is applied. An electrically conductive reduction gear 21 is integral with an electrically conductive, grounded, main interlocking shaft 22 and may be driven from the motor 19 through a motor gear 20. A rotary shutter 23 is provided on one end of the main interlocking shaft 22 to uncover and cover an exposure window along which a film is moved. The opening and closing of the shutter takes place in synchronism with one complete rotation of the gear 21 and one-frame feed of the film is effected by unshown film transport means associated with the shaft 22 when the shutter is closed. The gears 20, 21 and the shaft 22 constitute a shutter driving mechanism for driving the shutter and transporting the film. On one side surface of the electrically conductive reduction gear 21, a slidable contact member 9 forming the reset switch and a slidable contact member 18 forming the phase switch are in contact with the one side surface of the gear 21 on different circumferences thereof. On that circumference of the reduction gear 21 which is contacted by the phase switch 18, there are provided insulating plates 25a and 25b which are symmetrically located about the axis of rotation. On that circumference of the reduction gear 21 which is contacted by the reset switch 9, there are provided insulating plates 26a and 26b which are symmetrically located about the axis of rotation. The electrically conductive reduction gear 21 and the insulating plates 25a, 25b, 26a and 26b thereon and the slidable contact members 18 and 9 constitute the phase switch 18 and the reset switch 9 of FIG. 1, respectively, and the opening and closing of these switches are effected by rotation of the electrically conductive reduction gear 21. A cam 29 formed of insulating material is mounted on the main interlocking shaft, and a movable contact member 14a resiliently engaging the cam surface and a fixed contact member 14b together constitute the timing switch 14, the opening and closing of which is effected by rotation of the cam 29 resulting from rotation of the reduction gear 21. On said side surface of the reduction gear 21, there is further provided a closed position projection 27 for stopping the shutter driving mechanism in closed shutter position in which the shutter is completely closed and an open position projection 28 for stopping the shutter driving mechanism in open shutter position in which the shutter is fully opened.

An electrically conductive restraining lever 32 is pivotally supported on a pin 33 and has one end forming a restraining pawl 32a engageable with the projection 27 or 28 and the other end forming an attractable member 32b. The restraining lever is biased counter-clockwise by an electrically conductive, grounded spring 34 so as to bring the restraining pawl 32a into engagement with the projection 27 or 28. Since the spring 34 is grounded, the restraining lever is at ground potential. A core 35 is common to the first and second electromagnet coils 10 and 16 and cooperates with these coils to form an electromagnet, which, when energized by a current flowing through the coil 10, attracts the attractable member 32b to cause the restraining lever 32 to be rotated clockwise against the force of the spring 34 and disengaged from the projection 27 or 28, to thereby permit free rotation of the gear 21 and bring about engagement between the contact member 17 forming the motor switch and the restraining lever 32, thus closing the motor switch to permit power supply to the motor 19.

Figure 3:
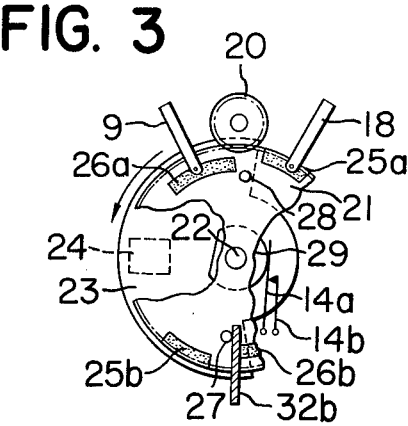
FIGS. 3 and 4 illustrate the operational relationship in FIG. 2.
Figure 4:
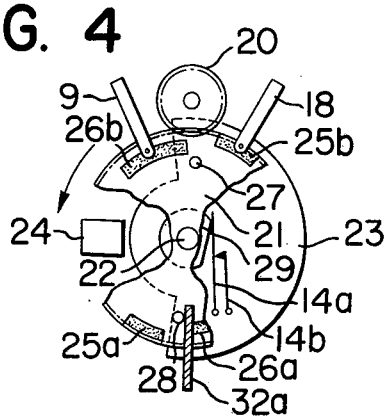

FIGS. 3 and 4 are views as seen from the right side of FIG. 2 to help understand the phase relationships between the various switches in FIG. 2, and show the gear 21 partly cut-away. FIG. 3 shows a position in which the closed position projection 27 is in engagement with the restraining pawl 32a and FIG. 4 shows a position in which the open position projection 28 is in engagement with the restraining pawl 32a. The arrow indicates the direction of rotation of the gear 21.

FIG. 5 is a phase illustration showing the sequence of opening and closing of each switch and the shutter during one complete rotation the gear 21 starting from the position in which the restraining pawl 32a engages the closed position projection 27, such position being the zero-angle or reference position 0°. In FIG. 5, (A) indicates the sequence of opening and closing of the shutter, and (B), (C) and (D) indicate the sequences of opening and closing of the phase switch 18, the reset switch 9 and the timing switch 14, respectively.

Operation of the present electromagnetic trigger device will now be described.

When the photography mode change-over switch 12 selects the contact 12a, i.e. the mode of continuous photography, the device operates in the manner described hereinafter. When as shown in FIGS. 2 and 3, the closed position projection 27 is engaged by the restraining pawl 32a to stop the shutter driving mechanism in the closed shutter position, depression of the release button B closes the second trigger switch 4 operatively associated therewith and the first trigger switch 3 is changed over to the contact 3b from the contact 3a connected to the power source. As a result, the charge stored in the actuating capacitor 2 flows out as a base current to the transistor 8, whereby the positive feedback circuit formed by the transistors 6 and 8 is rendered conductive. Upon conduction of the transistor 6, a current flows to the actuating coil 10 which thus energizes the core 35, which in turn attracts the attractable member 32b to rotate the restraining lever 32 clockwise against the force of the spring 34, as viewed in FIG. 2. The second or holding coil 16 is also energized because it is supplied with a current through the change-over switch 12 and the diode 13. On the other hand, the timing switch 14 is also in its closed position as shown in FIG. 5(D), so that the capacitor 15 is charged through the diode 13, but such charging is immediately completed because the forward resistance of the diode 13 is very low.

When the attractable member 32b is attracted to the core 35, the restraining pawl 32 is disengaged from the projection 27 to close the motor switch 17, thus energizing the motor 19 for rotation. The rotation of the motor 19 causes rotation of the gear 21. When the gear 21 is rotated through an angle $\theta_1$, the reset switch 9 is closed as shown in FIG. 5(C), and thereby the base-emitter of the transistor 8 is short-circuited to render the same transistor non-conductive. Thus, the transistor 6 is also rendered non-conductive and the capacitor 2 is short-circuited thereacross to permit discharge therefrom, so that even if the reset switch 9 is opened again, the transistors 6 and 8 are not rendered conductive but remain non-conductive. Therefore, there is no current flowing to the actuating coil 10 but there is a current flowing to the holding coil 16 to maintain the core 35 continuously energized by the coil 16. Since this energization is sufficient to maintain the attractable member 32b in attracted condition, the attractable member 32b remains attracted and the motor 19 continues its rotation to effect continuous photography as long as the second trigger switch 4 is closed.

When the release button B is released to interrupt the continuous photography, the first trigger switch 3 is changed over to the contact 3a and the second trigger switch 4 is opened, so that the energizing current from the power source 1 to the holding coil 16 is cut off. Considering the timing with which the release button is released, the user releases the button regardless of the position of the projection 27 or 28 relative to the restraining pawl 32a and therefore, some contingency governs whether the pawl 32a is engaged with the closed position projection 27, namely the shutter driving mechanism is latched in the closed shutter position, or the pawl is engaged with the open position 28, namely the shutter driving mechanism is latched in the open shutter position. In the embodiment of the present invention, this problem is solved by such a design that when the restraining pawl 32a and the projections 27, 28 are in a specific relative position, the restraining lever 32 is always returned into engagement with the closed position projection 27 by the capacitor 15 and the timing switch 14, whereby the shutter driving mechanism is stopped in the closed shutter position. The phase relationship of the timing switch 14, as shown in FIG. 5(D), is such that the switch is open within the range from the position of 180° to the angle $\theta_3$ and closed in the other range of position. The angle represented by $\theta_2$ is the value of an angle of rotation of the gear 21 corresponding to a time slightly longer than the time required for the restraining lever 32 to return from the position in which the member 32b is attracted to the core 35 to the position in which the restraining pawl 32a is engageable with the projection 27 or 28. The capacity of the capacitor 15 is selected such that the current flowing from the capacitor 15 to the holding coil 16 maintains the attractable member 32b attracted to the core 35 for a time longer than the time required for the gear 21 to rotate through the angle of $(360° - \theta_3)$. If the release button B is released within the range of of relative position indicated by $\theta_3$ in FIG. 5, no current will flow to the holding coil 16 since the second trigger switch 4 and the timing switch 14 are both open, and therefore the restraining lever 32 will be returned by the bias of the spring 34 to the position in which the restraining pawl 32a is engageable with the side surface of the gear 21 to thereby open the motor switch 17, while the motor 19 will be driven through closure of the phase switch 18 to the position in which the restraining pawl 32a engages the closed position projection 27, whereupon the phase switch 18 will be opened to cut off the current supply and the motor 19 and the shutter driving mechanism will be stopped by the engagement of the pawl 32a with the projection 27. This will ensure the shutter to be stopped in its closed position. Also, the timing switch 14 is closed within the range indicated by $\theta_2$, but the force provided by the holding coil 16 is only sufficient to hold the attracted condition but not sufficient to attract the restraining lever 32 back from its condition in which the pawl 32a is engaged with the side surface of the gear 21, and thus the lever 32 is affected in no way by any discharge current flowing from the capacitor 15 to the holding coil 16.

If the release button B is released without the range of $\theta_3$ in FIG. 5, the second trigger switch 4 will be opened to cut off the flow of current to the holding coil 16 but the timing switch 14 will remain closed and the capacity of the capacitor 15 is so selected as described above, so that the capacitor 15 discharges to maintain the attractable member 32b attracted to the core 35 until the timing switch 14 is open when the relative position of the gear 21 equals the position of 180° shown in FIG. 5, whereupon the flow of current to the holding coil 16 is cut off to liberate the attractable member from its attracted position to the position in which the restraining pawl 32a is engageable with the side surface of the gear 21. By that time however, the open position projection 28 has already passed said position and no engagement occurs between the projection 28 and the restraining pawl 32a but engagement may occur only between the closed position projection 27 and the restraining pawl. In such condition, the motor switch 17 is opened but the gear 21 is driven, as described, through the parallel-connected phase switch 18 which is then in the phase relationship as shown in FIG. 5, to the position in which the restraining pawl 32a is engageable with the closed position projection 27, and thus the motor 19 is stopped upon open of the switch 18. Accordingly, the shutter is stopped in its closed position without fail. The timing switch 14 is closed when the range of $\theta_3$ is exceeded, but this will affect in no way, as already described.

Single-frame photography will now be described. Single-frame photography may occur when the photography mode change-over switch 12 selects the contact 12b. When, as shown in FIGS. 2 and 3, the closed position projection 27 and the restraining pawl 32a are in engagement with each other, depression of the release button B changes over the first trigger switch 3 from the contact 3a to the contact 3b and the second trigger switch 4 is closed to render the transistors 6 and 8 conductive through the actuating capacitor 2, thus permitting a flow of current to the actuating coil 10, as already noted. Since the change-over switch 12 has selected the contact 12b, the capacitor 15 begins to be charged through the transistor 6, change-over switch 12, diode 13 and timing switch 14, and a current also flows to the holding current 16. By energization of the actuating coil 10, the attractable member 32b is attracted to the core 35 to disengage the restraining pawl 32a from the closed position projection 27, thereby closing the motor switch 17 to rotate the motor 19. The gear 21 is thus rotated through the angle $\theta_1$ by the motor 19, whereupon the reset switch 9 is closed to turn off the transistors 6 and 8. On the other hand, the charging time of the capacitor 15 is so short that it is completed within the time required for the gear 21 to rotate through $\theta_1$. By the turn-off of the transistor 6, the flow of current to the actuating coil 10 is cut off, but since the timing switch 14 is closed as indicated in FIG. 5(D) and the capacity of the capacitor 15 is predetermined as described, the discharging current of the capacitor 15 flows through the timing switch 14 to the holding coil 16 to maintain the attractable member 32b attracted. Also, the discharge current of the capacitor 15 is prevented from flowing through the resistor 7 because the diode 13 is blocking any inverse current. As a result, the motor 19 continues to rotate and, when the gear 21 reaches the position of 180° in FIG. 5, the timing switch 14 is opened to liberate the attractable member from its attracted condition in the same manner as described to thereby rotate the restraining pawl 32a counter-clockwise and back to the position in which it is engageable with the side surface of the gear 21, whereas the restraining pawl does not engage the open position projection 28 because this projection has already passed said position. Such rotation of the restraining pawl opens the motor switch 17, but the motor 19 is driven through the parallel-connected phase switch 18 to the position in which the restraining pawl 32a engages the closed position projection 27, whereupon the motor and the shutter driving mechanisms are stopped in the closed shutter position. Continued depression of the trigger button B will cause no change with the motor maintained inoperative. Release of the trigger button followed by re-depression thereof will ensure the gear to make a complete rotation and stop the shutter driving mechanism in the closed shutter position. In this way, each depression of the trigger button causes the gear 21 to make a complete rotation to thereby effect film exposure and one-frame feed of the film, thus accomplishing single-frame photography.

Time photography will now be explained. Time photography occurs when the photography mode change-over switch 12 selects the contact 12c. When, as shown in FIGS. 2 and 3, the restraining pawl 32a is in engagement with the closed position projection 27, depression of the release button B causes the first trigger switch 3 to be changed over from the contact 3a to the contact 3b and the second trigger switch 4 is closed to render the transistors 6 and 8 through the actuating capacitor 2, thereby permitting a flow of current to the actuating coil 10, as already noted. Since the change-over switch 12 has selected the non-connected contact 12c, there is no operation effected by the holding coil 16. The operation resulting from the energization of the actuating coil 10 takes place in the same manner as previously described, so that the motor 19 is driven to rotate the gear 21 through the angle $\theta_1$, whereupon the reset switch 9 is closed to turn off the transistors 6 and 8. As a result, the flow of current to the actuating coil 10 is cut off operative, so that the attractable member 32b is liberated from the core 35 to return the restraining pawl 32a to its engageable position and the motor switch 17 is opened, but the motor 19 is driven, by closing of the parallel-connected phase switch 18, to the position in which the restraining pawl 32a engages the open position 28, and stopped in that position by the opening of the switch 18 and by the engagement of the pawl 32a with the projection 28. Continued depression of the release button B will cause no change and the motor will remain stopped in the open shutter position as shown in FIG. 4. Release of the button B will neither cause any change and the film will remain exposed to light. The reset switch 9, as shown in FIG. 5(C), is open when the pawl 32a is in engagement with the open position projection 28. Therefore, when the trigger button is again depressed, the actuating capacitor 2 renders the transistors 6 and 8 conductive to cause the energization of the actuating coil 10, so that the engagement is broken away to permit the motor 19 to rotate the gear 21. When the gear has made a slight angular rotation, the reset switch 9 is closed as shown in FIG. 5(C) and therefore, the flow of current to the actuating coil 10 is cut off to permit the restraining pawl 32a to restore its engageable position and the motor switch 17 is opened, but the motor 19 is driven, by the closing of the phase switch 18, to the position in which the restraining pawl 32a engages the closed position projection 27, and stopped in that position. At the same time, the shutter is closed, whereupon the film is transported by one frame by means of the film transport mechanism. Continued depression of the trigger button will cause no change and the motor will remain stopped in the closed shutter position as shown in FIG. 3. Release of the trigger button will neither cause any change with the shutter remaining in the closed condition. Thus, each depression of the trigger button will bring about the positions off FIGS. 3 and 4 alternately, thus accomplishing time photography.

The means for restraining the shutter driving mechanism 20, 21 and 22 is not restricted so that in the foregoing embodiment, but similar operation may equally be achieved, for example, by providing a single projection instead of two projections 27, 28 in FIG. 3 and by providing, in addition to the restraining lever 32, another restraining lever likewise controllable by the electromagnet 10, 16, 35 and engageable with said single projection, said another lever being located 180° out of phase with respect to the lever 32.

In case where the phase switch 18 is eliminated, the shutter driving mechanism 20, 21, 22 and the motor is so designed that the shutter driving mechanism may be driven by inertia of the mechanism and the motor to the position 360° (FIG. 5) when the motor 19 is deenergized through opening of the motor switch 17 following opening of the timing switch 14 in single-frame or continuous photography, and that the mechanism may be driven by inertia of the motor 19 and the mechanism, caused by rotation of the motor 19 during $\theta_1$, when the motor 19 is deenergized through closure of the reset switch 9 in time photography.

FIG. 6 shows a second embodiment of the present invention. In the embodiment of FIG. 1, the capacitor 15 in use must be of a great capacity when the holding coil is of a low resistance and thus, the capacitor must necessarily be large in size. The embodiment of FIG. 6 solves this problem by using a transistor 43 for the switching of the holding coil.

More particularly, as shown in FIG. 6, a serial connection of resistors 41 and 42 is connected between the cathode of the inverse current blocking diode 13 and the negative terminal of the power source 1, and the transistor 43 has its base connected to the junction between the resistors 41 and 42, its emitter connected to the negative terminal of the power source 1, and its collector connected to the positive terminal of the power source 1 through the holding coil 16. A diode 44 is parallel-connected to the holding coil 16 to absorb any inverse voltage produced across the holding coil 16 so as to prevent such inverse voltage from affecting other elements. The base current of the transistor 43 is a switchable small current and therefore, the resistor 41 is of high resistance. Accordingly, the discharge resistance as viewed from the capacitor 40 is very high as compared with the resistance of the holding coil 16, and this leads to a very low capacity and small size available for the capacitor 40. Like the capacitor 13 in FIG. 1, the capacitor 40 has its capacity selected to such a value that the charge discharged from the capacitor 40 switches on a transistor 43 to permit a flow of current to the holding coil so as to maintain the attractable member for a time longer than the time required for the gear 21 to rotate through the angle of (360° - $\theta_3$). The operation of the capacitor 40 is similar to what has been described in connection with FIG. 1, with the exception that the flow of current to the holding coil 16 occurs through the transistor 43.

Figure 7:
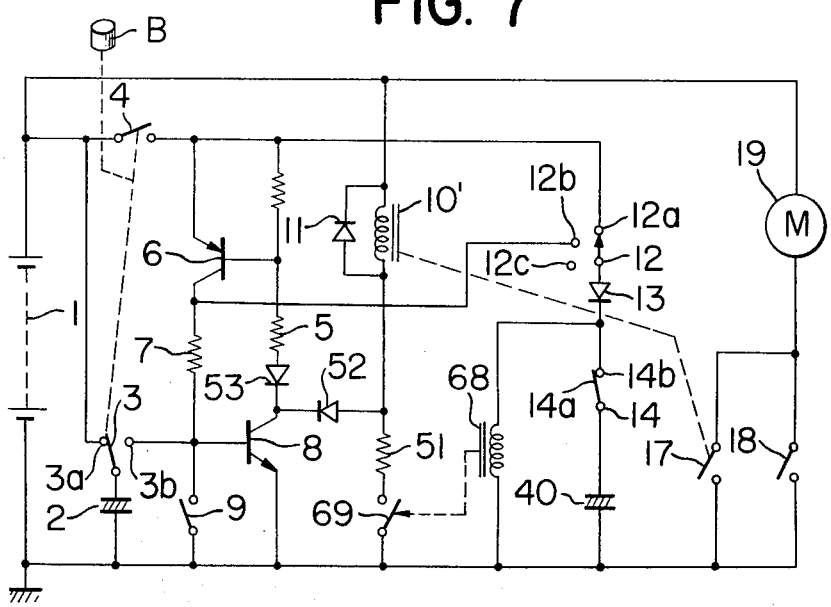

FIG. 7 shows a third embodiment of the present invention. In the embodiment of FIGS. 1 and 2, the actuating coil 10 and the holding coil 16 are employed for the electromagnet coil, whereas in the present embodiment an actuating coil 10' alone is used to serve the dual purposes of actuating the restraining lever 32 and holding its attracted condition, thus reducing the volume of the electromagnet coil portion. Also, in the present embodiment, a relay switch is employed in lieu of the switching transistor 43 of FIG. 6. Transistors 6 and 8 together form a positive feedback circuit as in FIG. 1. The actuating-holding coil 10' has one end thereof connected to the positive terminal of the power source 1 and the other end connected to the collector of the transistor 8 through an inverse current blocking diode 52. A relay coil 68 is parallel-connected to the timing switch 14 and the capacitor 40. A relay switch 69, which may be closed during energization of the relay coil 68 and opened during deenergization of the relay coil, has one end thereof connected to the junction between the actuating-holding coil 10' and the diode 52, and has the other end connected to the negative terminal of the power source. Between the collector of the transistor 8 and the resistor 5 connected to the base of the transistor 6, there is inserted a diode 53 for blocking inverse current.

The mode of continuous photography will now be described. In this mode, the change-over switch 12 selects the contact 12a. When, as shown in FIGS. 2 and 3, the closed position projection 27 is engaged by the restraining pawl 32a to stop the shutter in closed position, depression of the release button B renders the transistors 6 and 8 conductive through the actuating capacitor 2 as described in connection with FIG. 1, and the capacitor 40 is charged and a current flows to the relay coil 68 to close the relay switch 69. Thus, the actuating coil 10' is energized by the sum of a great current flowing through the diode 52 and the transistor 8 and a small current flowing through the resistor 51 and the switch 69, to thereby disengage the restraining pawl 32a from the closed position projection 27 and permit the gear 21 to be rotated by the motor 19. When the gear has rotated through the angle $\theta_1$, the reset switch 9 is closed to turn off the transistors 6 and 8 so that said great current is cut off, but since a current is flowing through the coil 68, said small current flows to the actuating-holding coil 10' through the relay switch 69 and the current restricting resistor 51. Such small holding current is of a value selected such as to enable the core 35 to maintain the attractable member 32b attracted thereto. The transistor 6 is not biased forwardly, because of the presence of the diode, to render the positive feedback circuit conductive. Thus, the holding current flows to the actuating-holding coil 10' to maintain the attracted condition of the attractable member so as to permit continuous photography to occur as long as the trigger button is depressed. Next, when a trigger button is released and if the timing of the release is within the range of $\theta_3$ in FIG. 5, the restraining lever 32 will immediately return in the same manner as described with respect to FIG. 1, but if the timing is without the range of $\theta_3$, the attracted condition will be held to the 180° position of FIG. 5 by the discharge current of the capacitor 40 and the restraining lever will return for engagement with the closed position projection 27 only when the 180° position has been passed, thus stopping the shutter driving mechanism in the closed shutter position. In the stop position, the closure of the relay switch 69 by the remaining discharge current of the capacitor 40 permits the holding current to flow to the actuating-holding cell 10', but such current is not sufficient to produce a force for actuating the lever and so, the engagement of the restraining pawl 32a and the projection 27 is remained. The remaining charge in the capacitor is quickly discharged through the relay coil 68 and the relay switch 69 is opened, whereafter there is no flow of current.

When the change-over switch 12 selects the contact 12b, namely, the mode of single-frame photography, depression of the trigger button B renders the transistors 6 and 8 conductive through the actuating capacitor 2, and the capacitor 40 is charged through the transistor 6 and the switch 12. A current also flows to the relay coil 68 to close the relay switch 69. Thus, there is a current flowing to the actuating-holding coil 10' to disengage the restraining pawl 32a from the closed position projection 27 to permit the gear 21 to be rotated by the motor 19. When the gear has rotated through the angle $\theta_1$, the reset switch 9 renders the transistors 6 and 8 non-conductive, but since a discharge current flows from the capacitor 40 to the relay coil 68 through the timing switch 14, a small holding current flows to the actuating-holding coil 10' through the relay switch 69 and the current restricting resistor 51. As a result, the attracted condition of the attractable member 32b with respect to the core 35 is held until the timing switch 14 is opened, namely, until the 180° position of FIG. 5 is reached, and when the 180° position has been passed, the restraining lever 32 is returned and at the 360° position the phase switch 18 is opened to stop the motor 19 and to permit the lever 32 to engage the closed position projection 27 and the shutter driving mechanism stops in the closed shutter position. Thus, each depression of the trigger button results in one-frame photography.

When the change-over switch 12 selects the contact 12c, namely, time photography, no charging occurs to the capacitor 40 because the contact 12c is a non-connected contact, and the relay coil 68 remains unenergized to maintain the relay switch 69 open, so that no holding current flows to effect holding operation. As a result, the current flowing to the actuating-holding coil 10' is controlled by the state of the transistor 8 and thus, as in the operation of time photography described in connection with FIG. 1, each depression of the trigger button alternately brings about the conditions shown in FIGS. 3 and 4, thereby effecting time photography. In the present embodiment, the coil resistance of the relay coil 68 may be sufficiently great and this enables the capacity of the capacitor 40 to be lower than in the first embodiment, which in turn leads to a small size of the capacitor 40.

Figure 8:
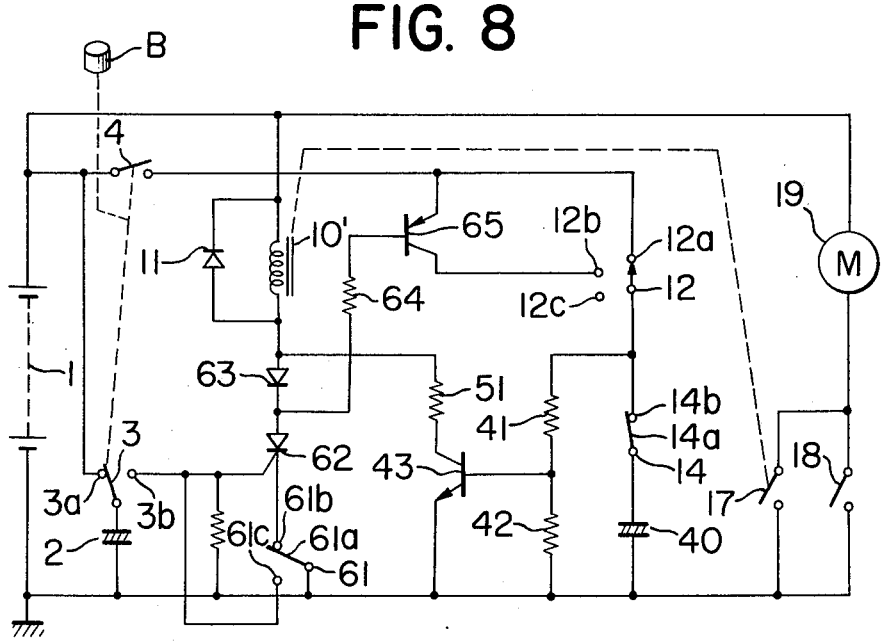

FIG. 8 shows a fourth embodiment of the present invention. In this embodiment, the electromagnet coil is the actuating-holding coil 10' alone, as in the embodiment of FIG. 7, and switching of the current flowing to the coil 10' is effected by an SCR. The actuating-holding coil 10' has one end thereof connected to the positive terminal of the power source and the other end connected to the anode of the SCR 62 through an inverse current blocking diode 63. The cathode of the SCR 62 is connected to the contact 61b of a reset switch 61, and the gate of the SCR is connected to the contact 3b of the trigger switch 3 and to the contact 61c of the reset switch 61. The reset switch 61 is inserted between the cathode of the SCR 62 and the negative terminal of the power source 1 to reset the SCR 62 from its conductive state to its non-conductive state, and has change-over contacts 61b and 61c so as to shortcircuit the opposite ends of the actuating capacitor 2 in order to permit quick discharging of the capacitor 2. The movable contact 61a of the reset switch is connected to the negative terminal of the power source. Transistor 65 for charging of capacitor 40 during single-frame photography has its emitter connected to the positive terminal of the power source through the second trigger switch 4, its collector connected to the single-frame photography contact 12b, and its base connected to the junction between a diode 63 and the SCR 62 through a resistor 64. Transistor 43 effects switching of the holding current flowing to the actuating-holding coil 10' through the resistor 51, as in the embodiment of FIG. 7.

FIGS. 9 and 10 illustrate the construction and operation of the reset switch 61. Instead of the reset switch 9 of FIG. 2, a cam 66 formed of insulating material is mounted on the main interlocking shaft 22, and the springy movable contact 61a is normally engaged with the contacts 61b and may be changed over into engagement with the contact 61c by the cam 66. FIGS. 9 and 10 illustrate the manner in which the reset switch 61 is actuated by the cam 66. FIG. 9 refers to a position assumed by the reset switch 61 during the rest position of FIG. 3 or 4, and FIG. 10 refers to a position in which the reset switch 61 resets the SCR 62 during rotation of the motor 19 with the movable contact 61a brought into engagement with the contact 61c by a convex portion of the cam 66.

When the change-over switch 12 selects the contact 12a, namely, the mode of continuous photography, the operation will occur in the manner described below. Depression of the release button renders the SCR 62 conductive through the actuating capacitor 2 to permit an actuating current flow to the actuating-holding coil 10' through the diode 63, SCR 62 and reset switch 61. Since the trigger switch 4 is closed, the capacitor 40 is also charged and the transistor 43 is rendered conductive. The restraining lever 32 is actuated by the actuating current in the actuating-holding coil 10', and the gear 21 is rotated by the motor 19. When the gear is rotated through angle $\theta_1$ of FIG. 5, the reset switch 61 is changed over by the cam 66 in the manner as shown in FIG. 10 to turn off the SCR 62 and short-circuit the capacitor 2, thus permitting the capacitor to discharge its remaining charge. The SCR 62 is so turned off, but a holding current sufficient to maintain the attractable member 32b attracted to the core 35 flows to the actuating-holding coil 10' through the current restricting resistor 51, so that the attracted condition is maintained to permit the gear 21 to be rotated for a continuous photography by the motor 19 until the release button B is released to open the second trigger switch 4. When the release button is released, the restraining pawl 32a never fails to engage the closed position projection 27 through the operation of the timing switch 14 and of the capacitor 40, as previously described, and the shutter driving mechanism is stopped in the closed shutter position.

When the change-over switch 12 selects the contact 12b, namely, the mode of single-frame photography, depression of the trigger button renders the SCR 62 conductive, as described, to permit an actuating current to flow to the actuating-holding coil 10' and the transistor 65 is forwardly biased through the resistor 64 and accordingly rendered conductive to quickly charge the capacitor 40 while rendering the transistor 43 conductive. The restraining lever 32 is disengaged to permit the gear 21 to be rotated by the motor 19 and, when the gear is rotated through $\theta_1$, the reset switch 61 is actuated by the cam 66 to turn off the SCR 62 as described, so that there is no actuating current flowing to the actuating-holding coil 10' and the transistor 65 becomes non-conductive, but the attracted condition of the attractable member 32b is maintained by a holding current flowing with the aid of the timing switch 14 and the capacitor 40 in the same manner as previously described. At this time, the transistor 65 is not rendered conductive by the conduction of the transistor 43, because of the inverse current blocking diode 63. Thus, as previously described, the restraining lever 32, when it has passed the 180° position of FIG. 5, is returned for engagement with the closed position projection 27 by the open of the timing switch 14, and the shutter driving mechanism is stopped in the 360° position. Thereafter, continued depression of the trigger button will cause no change and thus, each depression of the trigger button will result in single-frame photography.

When the change-over switch 12 selects the contact 12c, namely, the mode of time photography, the transistor 43 remains non-conductive because the contact 12c is non-connected, and no holding operation occurs but as previously described, the gear 21 is rotated through 180° by the operation of the reset switch 61 upon each depression of the trigger button B, whereafter the gear is stopped. Thus, the conditions shown in FIGS. 3 and 4 are alternately provided to effect time photography.

FIG. 11 shows a fifth embodiment of the present invention. This embodiment eliminates the positive feedback circuit (transistors 6 and 8) and reset switch 9 employed in the previous embodiment and instead, utilizes the actuating capacitor 2 alone to perform their functions. In FIG. 11, the charge stored in the capacitor 2 by the operation of the trigger switches 3 and 4 is discharged directly through the actuating coil 10 so as to provide thereto for a flow of current sufficient to attract the restraining lever 32.

The capacity of the capacitor 2 is selected such that the time required for the discharge current to flow out is substantially equal to the time $\theta_1$ required for the reset switch 9 in the previous embodiment to be closed.

When continuous photography is desired, two changeover switches 120 and 220 are respectively connected to a nonconnected contact 120a and a contact 220a which is connected to the coil 16. The release button B is then depressed, the trigger switch 3 is connected to the contact 3b as previously described, and the trigger switch 4 is closed, whereupon the discharge current from the capacitor 2 flows to the actuating coil 10 to thereby disengage the restraining lever 32 in the same manner as previously described, thus closing the motor switch 17 and energizing the motor 19. On the other hand, the closure of the switch 4 permits the capacitor 15 to be charged by the power 1 through the change-over switch 220 and timing switch 14. The amount of such charging current is equal to the necessary amount of charging current for the capacitor 15 in the above-described first to fourth embodiments. A holding current also flows from the power source 1 to the holding coil 16 through the switch 220, so that continuous photography can occur as long as the release button is depressed.

If the release button is released when the timing switch 14 is in its open position ($\theta_3$ in FIG. 5), there is no current flowing to the holding coil 16 from the capacitor 15 nor from the power source 1, as previously described, so that the shutter driving mechanism is stopped in the closed shutter position (FIG. 3) upon opening of the phase switch 18. If the release button is released when the timing switch 14 is in its closed position, a discharge current from the capacitor 15 flows to the holding coil 16 through the switch 14, so that the shutter driving mechanism never fails to be stopped in the closed shutter position by opening of the timing switch 14 and phase switch 18.

When single-frame photography is desired, the changeover switches 120 and 220 are respectively connected to the contact 120b, which is connected to the junction between the capacitor 15 and the timing switch 14, and the non-connected contact 220b. The release button is depressed to change over the trigger switches 3 and 4, whereby the discharge current from the capacitor 2 energizes the actuating coil 10 to rotate the motor 19 while said discharge current also flows to charge the capacitor 15 through the inverse current blocking diode 70 and the change-over switch 120.

Even after the discharge current from the capacitor 2 is exhausted and the actuating coil deenergized, the holding coil 16 is still supplied with the discharge current from the capacitor 15 so that, as previously described, the shutter driving mechanism 20, 21 and 22 never fails to be stopped in the closed shutter position upon opening of the phase switch 18 after one-frame exposure has been completed.

When time photography is desired, the change-over switches 120 and 220 are respectively connected to the nonconnected contacts 120c and 220c. The release button is depressed, whereby the actuating coil 10 is energized to rotate the motor 19, but since the two switches 120 and 220 are both open, the capacitor 15 is not charged and no current is supplied to the holding coil 16, so that the shutter driving mechanism never fails to be stopped in the open shutter position upon opening of the phase switch 18. When the release button is again depressed, the same operation as described will occur and the shutter driving mechanism will be stopped in the closed shutter position, thus completing the time photography.

FIG. 12 shows an embodiment in which a transistor 43 is used for the switching of the holding coil 16 as in FIGS. 6 an 8.

Operation of this embodiment is similar to that of the FIG. 11 embodiment and need not be described.

Figure 13:
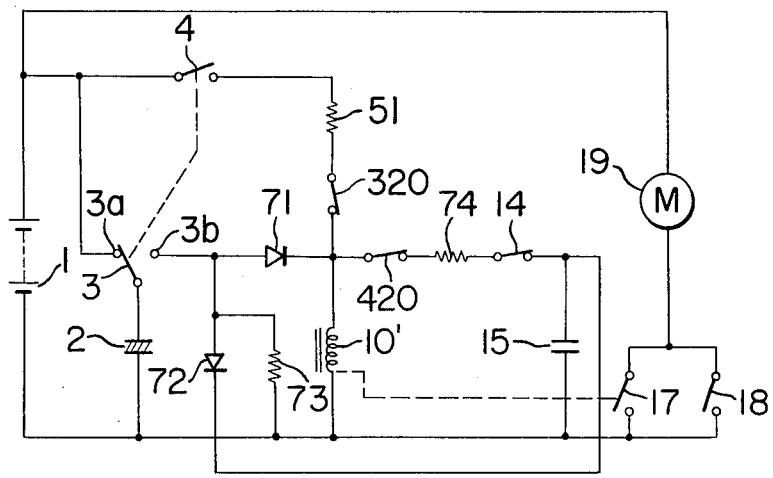

FIG. 13 shows a seventh embodiment in which the actuating coil 10 and the holding coil 16 in the fifth embodiment of FIG. 11 is provided by a common coil.

When continuous photography is desired, changeover switches 320 and 420 are all closed and the release button is depressed to change over the trigger switch 3 to the contact 3b and close the trigger switch 4, whereby the discharge or actuating current from the actuating capacitor 2 flows to the actuating-holding coil 10' through the inverse current blocking diode 71 so that the motor switch 17 is closed to energize the motor 19. On the other hand, as long as the trigger switch 4 is closed, holding current flows from the power source 1 to the actuating-holding coil 10' through the current restricting resistor 51 and thus, photography continues as long as the release button is depressed. Current is also supplied from the capacitor 2 to the capacitor 15 through the inverse current blocking diode 72 to charge the latter capacitor.

If the release button is released when the timing switch 14 is open (see FIG. 5), the actuating-holding coil 10' is immediately deenergized since it is supplied with no current from the capacitor 15, and consequently the phase switch 18 is opened to stop the shutter driving mechanism in the closed shutter position. Also, if the release button is released when time timing switch 14 is in its closed position, the coil 10' remains energized since discharge current is flowing from the capacitor 15 to that coil through the timing switch 14, resistor 74 and change-over switch 420, and the coil 10' is later deenergized upon opening of the timing switch 14. The phase switch 18 is then opened to stop the shutter driving mechanism in the closed shutter position.

When one-frame photography is desired, the change-over switch 320 is opened while the change-over switch 420 is closed and the release button is depressed, whereby discharge current as the actuating current flows from the actuating capacitor 2 to the actuating-holding coil 10' to rotate the motor 19. At the same time, the discharge current from the capacitor 2 flows to charge the capacitor 15 through the inverse current blocking diode 72. No holding current flows because the change-over switch 320 is open. As soon as the actuating current from the capacitor 2 is exhausted, discharge current from the charged capacitor 15 flows to the actuating-holding coil 10' through the timing switch 14, resistor 74 and change-over switch 420 so that the restraining lever 32 is maintained attracted. Upon opening of the timing switch 14, the supply of discharge current from the capacitor 15 to the coil 10' is cut off to deenergize the coil 10', whereafter the phase switch 18 is opened to stop the shutter driving mechanism in the closed shutter position, thus completing one-frame photography.

When time photography is desired, the change-over switches 320 and 420 are opened and the release button is depressed, whereby discharge current from the actuating capacitor 2 flows to energize the actuating-holding coil 10' to rotate the motor 19. However, after such discharge current is exhausted, the coil 10' is supplied with no current from anywhere because the change-over switches 320 and 420 are opened and therefore, the coil is immediately deenergized, thus stopping the shutter driving mechanism in the closed shutter position by opening of the phase switch 18.

Thereafter, when the release button is again depressed, the same operation as described just above will occur and the shutter driving mechanism will be stopped in the closed shutter position, thus accomplishing time photography.

The resistor 74 serves to restrict the discharge current flowing from the capacitor 15 to the actuating-holding coil 10', and the resistor 73 serves to cause the remaining charge in the actuating capacitor 2 to be completely discharged therefrom after the actuating current has been flowed to the coil 10'.

Figure 14:
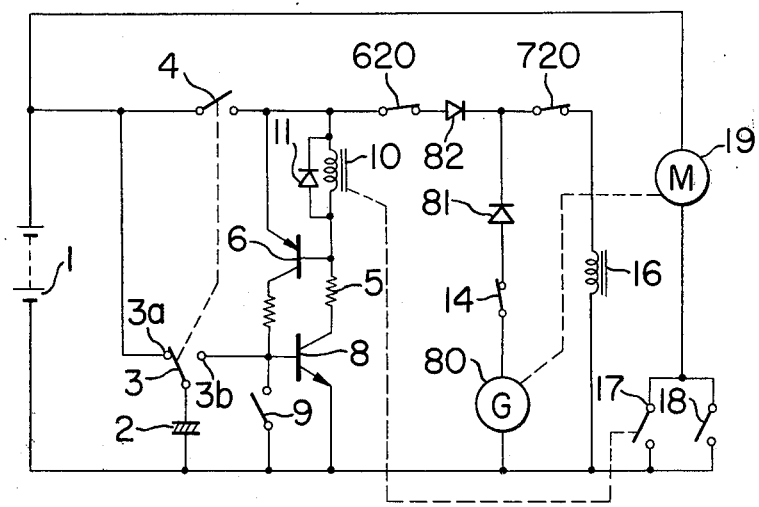

FIG. 14 shows an eighth embodiment which employs a generator in lieu of the capacitor 15 or 40 used in the first to seventh embodiments. The generator 80 is operatively associated with the motor 19 and may be driven by rotation of the motor 19 to generate an electromotive force.

Operation of this embodiment will now be described. When continuous photography is desired, photography mode changeover switches 620 and 720 are both closed and the release button is depressed to change over the trigger switch 3 to the contact 3b and close the switch 4, whereby the actuating coil 10 renders the positive feedback circuit 6, 8 conductive so that, as already described, the motor switch 17 is closed to permit power supply to the motor 19. At the same time, a current also flows from the power source 1 to the holding coil 16 through the change-over switches 620 and 720, so that even after the actuating coil is deenergized by, closing of the reset switch 9, continuous photography continues as long as the release button is depressed. On the other hand, the generator 80 generates an electromotive force due to rotation of the motor 19. The generator is designed such that the voltage of said electromotive force is lower than the terminal voltage of the holding coil 16. Therefore, as long as the trigger switch 4 is closed, there is no supply of current from the generator 80 to the holding coil 16. If the release button is released in the range $\theta_3$ of FIG. 5, namely, when the timing switch 14 is in open position, then there will be no supply of current from any of the power source 1 and the generator 80 to the holding coil 16 because the trigger switch 4 and the timing switch 14 are both open, and the phase switch 18 will thus be opened to stop the shutter driving mechanism in the closed shutter position.

If the release button is released in any other range than $\theta_3$, the trigger switch 4 is opened to cut off the supply of current from the power source 1 to the holding coil 16 while the generator 80 supplies a current to the holding coil 16 through the switches 14, 720 and the inverse current blocking diode 81, so that the holding coil maintains its holding action to permit continued rotation of the motor 19, but thereafter, in the range of $\theta_3$, the timing switch 14 is opened so that the shutter driving mechanism is stopped in the closed shutter position, as described, through the phase switch 18.

When single-frame photography is desired, the change-over switch 620 is opened while the change-over switch 720 is closed and the release button is depressed, whereby the motor 19 is rotated. Upon closing of the reset switch 9 (see $\theta_1$ in FIG. 5), the actuating coil 10 is deenergized but even thereafter, the motor continues its rotation because the holding coil 16 is still supplied with holding current from the generator 80 through the timing switch 14 and the change-over switch 720. Thereafter, when the timing switch 14 is opened in the range of $\theta_3$ of FIG. 5, the supply of current from the generator 80 to the holding coil 16 is cut off to deenergize the coil, whereafter the phase switch 18 is opened to stop the shutter driving mechanism in the closed shutter position, thus completing one-frame photography.

When time photography is desired, the change-over switch 720 is opened (the change-over switch 620 may be opened or closed at option) and the release button is depressed, whereby the actuating coil 10 is energized to rotate the motor 19. However, the opened change-over switch 720 cuts off the supply of current to the holding coil 16 from any of the power source 1 and the generator 80, so that the phase switch 18 is opened to stop the shutter driving mechanism in the open position. When the release button is again depressed, the motor is rotated in the same way as described just above, and then the phase switch 18 is opened to stop the shutter driving mechanism in the closed shutter position, thus completing time photography.

In this embodiment which uses a generator, it will be apparent that the actuating coil 10 and the holding coil 16 may be provided by a common coil and that the holding coil 16 may be provided with switching element 43 or 69 as shown in FIGS. 6, 7, 8 and 12.

According to the present invention, as will be appreciated from the foregoing description, it is ensured that, during normal photography, the shutter driving mechanism be stopped in the closed shutter position to prevent unnecessary exposure of the film whenever the release button is released and that, during time photography, each depression of the release button result in alternate opening and closing of the shutter to enable exposure time and the time interval between exposures to be provided as desired. Further, the present invention is very simple to construct because it utilizes electrical means to achieve its intended purposes.

I claim:

1. An electromagnetic trigger device in a camera capable of effecting time photography, said device comprising:
   1. a trigger switch;
   2. an electrical power source;
   3. a shutter driving mechanism;
   4. a motor for rotating the shutter driving mechanism;
   5. restraining means movable between a restraining position and a non-restraining position, said restraining means being adapted, when in said restraining position, to restrain said shutter driving mechanism in fully closed shutter position and in fully open position;
   6. a motor switch adapted to be closed to connect the power source to said motor when said restraining means is in said non-restraining position;
   7. an actuating coil energized to attract said restraining means for a predetermined time interval when said trigger switch is closed, said coil moving said restraining means to said non-restraining position upon energization of said coil, said predetermined time being shorter than the shorter of the time required for said shutter driving mechanism to move from the fully closed shutter position to the fully open shutter position and the time required for said shutter driving mechanism to move from the fully open shutter position to the fully closed shutter position;
   8. a selector member for selecting continuous photography and time photography;
   9. a holding coil responsive, when the continuous photography is selected, to closing of said trigger switch to be energized to hold said restraining means in said non-restraining position; and
   10. a current generating circuit including a timing switch connected between said trigger switch and said power source, said switch being adapted to be opened for a part of time interval from fully opening to fully closing of the shutter, said current generating circuit being adapted, when said trigger switch is opened during continuous photography, to flow a current through said timing switch to maintain said holding coil energized and hold said restraining means in said non-restraining position.

2. An electromagnetic trigger device according to claim 1, further comprising:
   a phase switch parallel-connected to said motor switch; and
   said phase switch being operatively associated with said shutter driving mechanism to be opened when the shutter is fully opened and when the shutter is fully closed.

3. An electromagnetic trigger device according to claim 1, wherein said restraining means includes a restraining member movable between said restraining position and said non-restraining position by the attraction of said actuating coil, and first and second engaging means rotatable with said shutter driving mechanism, said restraining member being, when in said restraining position, engageable with said first or said second engaging means to restrain said shutter driving mechanism in fully open shutter position or in fully closed shutter position.

4. An electromagnetic trigger device according to claim 3, wherein said shutter driving mechanism includes a rotatable member making a complete rotation during an exposure of the shutter, said first and second engaging members being fixed on said rotatable member and positioned symmetrically with respect to the axis of rotation of said rotatable member.

5. An electromagnetic trigger device according to claim 1, further comprising;
   a switching circuit adapted to be rendered conductive upon closing of said trigger switch to connect said actuating coil to said power source; and
   means responsive to said shutter driving mechanism to render said switching circuit non-conductive after said predetermined time interval.

6. An electromagnetic trigger device according to claim 5, wherein said current generating circuit includes a capacitor series connected to said timing switch,
   said capacitor being chargeable through said trigger switch when continuous photography is selected and dischargeable through said timing switch upon opening of said trigger switch,
   and wherein said switching circuit includes circuit means connected to said capacitor when single-frame photography is selected,
   said circuit means charging said capacitor with current from said power source when said switching circuit is rendered conductive and when single-frame photography is selected.

7. An electromagnetic trigger device according to claim 6, wherein said selector member includes a switch connecting said capacitor to said power source through said trigger switch when continuous photography is selected and connecting said capacitor to said circuit means when single-frame photography is selected.

8. An electromagnetic trigger device according to claim 7, wherein said capacitor is parallel-connected to said holding coil through said timing switch and the discharge current therefrom energizes said holding coil.

9. An electromagnetic trigger device according to claim 7, further comprising:
   switch means connected between said holding coil and said power source; and control means parallel-connected to said capacitor through said timing switch to control said switch means, said control means being operable by the discharge current from said capacitor to render said switch means conductive.

10. An electromagnetic trigger device according to claim 9, wherein said control means, when said selector member selects continuous photography and said trigger switch is closed, is operable by the current from said power source to render said switch means conductive.

11. An electromagnetic trigger device according to claim 10, wherein said switch means is a transistor and said control means is a resistor for imparting a bias voltage to the base of said transistor.

12. An electromagnetic trigger device according to claim 10, wherein said control means is a relay coil and said switch means is a relay switch adapted to be closed when said relay coil is energized.

13. An electromagnetic trigger device according to claim 1, wherein said current generating circuit includes a generator series-connected to said timing switch and powered on the rotational force of said motor.

14. An electromagnetic trigger device according to claim 1, wherein said holding coil and said actuating coil are provided by a common coil, and said common coil, when acting as the holding coil, is supplied with power through a current restraining resistor.

15. An electromagnetic trigger device according to claim 1, further comprising:
a bistable circuit adapted to be rendered conductive upon closing of said trigger switch to connect said actuating coil to said power source; and
switch means responsive to said shutter driving mechanism to render said bistable circuit non-conductive after said predetermined time interval.

16. An electromagnetic trigger device according to claim 15, further comprising:
an actuating capacitor chargeable by said power source when said trigger switch is open, and connectable to the input of said bistable circuit to render the same conductive in response to closing of said trigger switch.

17. An electromagnetic trigger device according to claim 16, wherein said bistable circuit is an SCR.

18. An electromagnetic trigger device according to claim 16, wherein said bistable circuit is a positive feedback circuit including a plurality of transistors.

19. An electromagnetic trigger device according to claim 1, wherein said timing switch is operatively associated with said shutter driving mechanism so as to be opened for said part of the time interval that starts at the point of the fully open shutter position, and the remaining part of said time interval is longer than at least the time required for said restraining means to move from said non-restraining position to said restraining position.

20. An electromagnetic trigger device according to claim 1, further comprising:
an actuating capacitor chargeable by said power source during opening of said trigger switch and connectable to said actuating coil in response to closing of said trigger switch, said actuating capacitor energizing said actuating coil by the discharge current therefrom, the capacity of said actuating capacitor being selected such as to energize said actuating coil for said predetermined time.

21. An electromagnetic trigger device according to claim 1, wherein said selector member is further capable of selecting single-frame photography, and when said selector member selects single-frame photography, said current generating circuit flows a current through said timing switch at least after said actuating coil is deenergized, whereby said holding coil is energized to hold said restraining means in said non-restraining position.

22. An electromagnetic trigger device according to claim 21, wherein said current generating circuit further includes a capacitor chargeable during energization of said actuating coil, said capacitor being dischargeable through said timing switch after deenergization of said actuating coil.

23. An electromagnetic trigger device in a camera capable of effecting time photography, said device comprising:
1. a trigger switch;
2. an electrical power source;
3. a shutter driving mechanism;
4. a motor for rotating the shutter driving mechanism;
5. restraining means movable, between a restraining position and a non-restraining position, said restraining means being adapted, when in said restraining position, to restrain said shutter driving mechanism in fully closed shutter position and in fully open position;
6. a motor switch adapted to be closed to connect the power source to said motor when said restraining means is in said non-restraining position;
7. an actuating coil energized to attract said restraining means for a predetermined time interval when said trigger switch is closed, said coil moving said restraining means to said non-restraining position upon energization of said coil, said predetermined time being shorter than the shorter of the time required for said shutter driving mechanism to move from the fully closed shutter position to the fully open shutter position and the time required for said shutter driving mechanism to move from the fully open shutter position to the fully closed shutter position;
8. a selector member for selecting single-frame photography and time photography;
9. a holding coil adapted, when energized, to hold said restraining means in said non-restraining position; and
10. a current generating circuit including a timing switch, said timing switch being adapted to be opened for a part of time interval from fully opening till fully closing of the shutter, said current generating circuit being adapted, during single-frame photography, to flow a current through said timing switch connected between said trigger switch and said power source to maintain said holding coil energized and hold said restraining means in said non-restraining position.

24. An electromagnetic trigger device according to claim 23, further comprising:
a phase switch parallel-connected to said motor switch; and
said phase switch being operatively associated with said shutter driving mechanism to be opened when the shutter is fully opened and when the shutter is fully closed.

25. In a motion picture camera having a shutter movable between closed and open positions repetitively, having restraining means operable to stop said shutter selectively in each of said positions, having mode selector means for selecting a time exposure mode or another mode of photography, and having means responsive to the actuation of a single release member for moving said shutter in each of said modes, the improvement comprising means operable when said mode selector means selects said time exposure mode for causing said restraining means to stop said shutter in its open position when said shutter has moved to that position following a first actuation of said release member and for causing said restraining means to stop said shutter in its closed position when said shutter has moved to that position following a second actuation of said release member, and means operable when mode selector means selects another photography mode for causing said restraining means to stop said shutter only in its closed position when it has moved to that position following any actuation of said release member.

26. In a motion picture camera having a shutter movable between closed and open positions repetitively, having a control button and having mode selector means for selecting a time exposure mode or a continuous mode of photography, means operative when said selector means selects said time exposure mode for moving said shutter only from its closed position to its open position or from its open position to its closed position in response to each depression of said button independently of the release of said button, and means operative when said selector means selects said continuous photography mode for moving said shutter continuously as long as said button is depressed and for closing said shutter in response to release of said button regardless of when said button is released.

27. The invention of claim 26, wherein said selector means is capable of selecting a single-frame mode of photography, and further comprising means operative when said selector means selects said single-frame mode for moving said shutter only from said closed position to said open position and then to said closed position again in response to each depression of said button independently of the release of said button.

* * * * *